(12) United States Patent
Liu

(10) Patent No.: US 7,169,307 B2
(45) Date of Patent: Jan. 30, 2007

(54) **PROCESS FOR THE EXTRACTION OF PACLITAXEL AND 9-DIHYDRO-13-ACETYLBACCATIN III FROM *TAXUS***

(76) Inventor: Jian Liu, c/o 470 Cherry Avenue, Fredericton, NB (CA) E3A 5N9

( * ) Notice: Subject to any disclaimer, the term of this patent is extended or adjusted under 35 U.S.C. 154(b) by 121 days.

(21) Appl. No.: 10/932,356

(22) Filed: Sep. 2, 2004

(65) Prior Publication Data

US 2006/0043020 A1    Mar. 2, 2006

(51) Int. Cl.
*B01D 15/08* (2006.01)

(52) U.S. Cl. .................. 210/635; 210/656; 210/198.2; 549/510; 549/511

(58) Field of Classification Search .............. 210/635, 210/656, 659, 198.2, 502.1; 549/510, 511
See application file for complete search history.

(56) References Cited

U.S. PATENT DOCUMENTS

| | | | | |
|---|---|---|---|---|
| 4,350,595 A | * | 9/1982 | Gunkel | 210/656 |
| 4,816,159 A | * | 3/1989 | Khosah et al. | 210/635 |
| 4,920,152 A | * | 4/1990 | Regnier et al. | 521/31 |
| 5,019,504 A | | 5/1991 | Christen et al. | |
| 5,158,676 A | * | 10/1992 | Kreher et al. | 210/198.2 |
| 5,380,916 A | | 1/1995 | Rao | |
| 5,407,674 A | | 4/1995 | Gabetta et al. | |
| 5,620,875 A | | 4/1997 | Hoffman et al. | |
| 5,670,673 A | | 9/1997 | Rao | |
| 5,674,455 A | * | 10/1997 | Marchand et al. | 422/70 |
| 5,893,971 A | * | 4/1999 | Shalon et al. | 210/198.2 |
| 5,964,996 A | * | 10/1999 | Armstrong | 204/450 |
| 5,969,165 A | | 10/1999 | Liu | |
| 6,002,025 A | * | 12/1999 | Page et al. | 549/510 |
| 6,036,855 A | * | 3/2000 | Shalon et al. | 210/198.2 |
| 6,229,027 B1 | * | 5/2001 | Liu | 549/510 |
| 6,452,024 B1 | * | 9/2002 | Bui-Khac et al. | 549/510 |
| 6,503,396 B2 | | 1/2003 | Kim et al. | |
| 6,746,695 B1 | * | 6/2004 | Martin et al. | 424/734 |
| 6,939,978 B2 | * | 9/2005 | Chang et al. | 549/510 |
| 2002/0197467 A1 | * | 12/2002 | Johnson | 428/333 |
| 2003/0013899 A1 | * | 1/2003 | Chang et al. | 549/510 |
| 2004/0186305 A1 | * | 9/2004 | Johnson et al. | 549/510 |

FOREIGN PATENT DOCUMENTS

| | | |
|---|---|---|
| CA | 2126698 | 10/1993 |
| CA | 2157905 | 9/1994 |
| CA | 2213952 | 8/1997 |

* cited by examiner

Primary Examiner—Ernest G. Therkorn

(57) ABSTRACT

This invention teaches a purification technology to extract an organic solution of paclitaxel by using a "Load and Lock Axial Compression Column" for industrial scale preparative high performance liquid chromatography. The "Load and Lock Axial Compression Column" is one in which a piston is used to pack and unpack the chromatography bed substantially to avoid voids therein, and to maintain bed compression during use. This effectively substantially prevents the formation of voids in the bed. The column can be packed with any packing material, including small particle size (e.g., about 10 μm) media, and very high plate numbers are generated. The bed length can be adjusted by controlling the amount of packing material used to prepare the column.

31 Claims, No Drawings

PROCESS FOR THE EXTRACTION OF PACLITAXEL AND 9-DIHYDRO-13-ACETYLBACCATIN III FROM *TAXUS*

FIELD OF THE INVENTION

This invention relates to the isolation and purification of taxane derivatives from a naturally occurring *Taxus* species.

BACKGROUND OF THE INVENTION

Taxol was first isolated in 1971 from the western yew, *Taxus brevifolia* by Wani, et al. Taxol is a member of the taxane family of diterpenes. Taxanes are diterpene compounds which find utility in the pharmaceutical field. Taxanes may be found in plant materials, and having been isolated therefrom. Paclitaxel is a well known chemotherapeutic drug for treatment of various metastatic cancers. It has been approved for the treatment of ovarian and breast cancers.

Taxal and various taxane derivatives are highly cytotoxic and possess strong in vivo activities in a number of leukemic and tumor systems. Taxol is considered to be an exceptionally promising cancer chemotherapeutic agent.

The only currently available source for taxol is several species of very slow growing yew (genus *Taxus*, family Taxaceae). Paclitaxel is a natural product, primarily extracted from the bark of the Pacific yew tree, *Taxus brevifolia*, and is also found in *T. baccata, T. walichiana, T. yunnanensis* and *T canadensis*. The isolation procedures currently practised are very difficult and low-yielding. The extraction of taxol from trees of the *Taxus* genus using liquid methanol has been reported. However, taxanes are generally present in plant materials in relatively small amounts so that, in the case of taxol, for example, large numbers of the slow-growing yew trees forming a source for the compound may be destroyed. Further, large amounts of organic solvents may be employed in a conventional liquid extraction, which may be time consuming as well.

The concentration of paclitaxel in various raw materials is typically low, for example, on the order of between about 0.0004 and about 0.01% (w/w) in the bark of Pacific yew. Such low concentration render the extraction and purification of the compound to pharmaceutical grade from raw materials very challenging, and heretofore impractical on a commercial scale. Various normal phase chromatography techniques have been developed to purify paclitaxel from a crude extract of raw material.

The success of low pressure chromatography greatly depends on the nature of the column. Various problems are associated with the use of silica gel and alumina trioxide, all of which are classical supports of the stationary phase in partition system. They form a stable stationary phase with most solvent systems, but is a strong absorbent and may participate in the separation process to the extent that chromatographic behaviour and recovery of samples are affected.

Chromatography methods have been developed to detect and isolate paclitaxel from various *Taxus* species on analytical and preparative basis. These isolation processes are mainly conducted on a small laboratory scale and suffer from low selectivity, recovery and high production cost, thereby presenting a serious and unfulfilled need for an economically practicable method for separating the valuable anti-tumor compound paclitaxel from its close analog cephalomanine as well as other closely related taxanes.

Prior art methods disclose the use of various types of chromatographic techniques to separate paclitaxel and related taxanes, including normal phase and reverse phase chromatography on a silica gel or bonded silica gel column. The prior art methods are end up at low yield, high production cost or involved multiple steps which were difficult to scale up to large industrial scale production.

The use of cultivable and renewable plant parts, such as the leaves (needles) and twigs of *Taxus* species should be the most practical and attractive way of increasing the supply of paclitaxel. The needles of several *Taxus* species, including *Taxus* canadensis, have been investigated and found to contain paclitaxel in amounts comparable to the bark of *Taxus brevifolia*.

*Taxus canadensis* is an evergreen shrub found in Eastern Canada and Northeastern United States. This species is unique in its taxane content. The needles contain a major taxane, 9-dihydro-13-acetylbaccatin III (9-DHAB III, 4) along with paclitaxel (0.009–0.05%), 10-deacetylbaccatin III (10-DAB III, 6), baccatin III, (5), cephalomannine, (3), and other minor taxanes. The concentration of (9-DHAB III in the needles is reportedly seven to ten times the concentration of paclitaxel. It appears that (9-DHAB III may be become an important precursor to a new class of semi-synthetic chemotherapeutic agents with increased water solubility.

The production of taxol from ornamental yew needles, barks and roots at present is not economical due to an extremely high percentage of unwanted impurities carried forward in the extract (about 40 to 50% by weight of the dried plant material) during the extraction. This unusually high percentage of impurities in the solvent extract at the needles of ornamental yew makes it very expensive and uneconomical to purify taxol and taxanes from this source in addition to the high cost in drying the needles.

The current procedures are lengthy, costly, or are practically limited to analytical scale. Since paclitaxel occurs in low levels in needles and the needles contains large amounts of waxes, the isolation and purification of paclitaxel from needles to a clinically acceptable purify pose additional challenges. A daunting task is the separation of paclitaxel from its closely related analogue cephalomannine which occurs in the needles and bark. The two analogues have been separated by selective chemical transformation of cephalomannine in a mixture containing both cephalomannine and paclitaxel. Disadvantages associated with these procedures include additional cost from the use of expensive, sometimes toxic, reagents, additional chromatography required to separate the transformed cephalomannine from paclitaxel, the destruction of cephalomannine and sometimes paclitaxel is during the process, and additional chemical transformations which are necessary for recovery of cephalomannine.

Thus, the art has continued to search for ever more efficient and environmentally safe methods for obtaining taxanes which minimize the use of plant materials and organic solvents.

The number of publications and patents describing the isolation and purification of paclitaxel and taxanes from *Taxus* specie is increasing, but the procedures currently known for isolation paclitaxel are very complex and difficult with a low yield. These patents described various isolation technology, from normal phase chromatography to reverse phase chromatography. The yields of paclitaxel from various species of *Taxus* genus range from 0.005–0.017%.

U.S. Pat. No. 5,019,504, issued 1991, to Christen, provided a culture process using *Taxus brov.folia* for producing the taxanes which were then separated by chromatography, by solvent extraction or adsorption methods. Culturing of plant cells is a difficult method for production of the taxanes for use on a large scale.

U.S. Pat. No. 5,380,916, issued Jan. 10, 1995, to Rao, provided a method for isolating certain clinically important taxane derivatives from the crude extract of a naturally occurring *Taxus* species. The method includes treating the extract by reverse phase liquid chromatography on an adsorbent. The taxane derivatives were caused to be adsorbed on the adsorbent. The taxane derivatives were recovered from the adsorbent by elution with an elutant. The patentee specifically taught the use of silica gel based reverse phase particles, e.g., hydrocarbon-bonded silica gel, cyano bonded silica gel, or phenylalkyl-bonded silica gel. Among the eluents taught were a polar elutant, e.g., lower alcohol, acetone, acetic acid, and acetonitrile, especially a water-miscible organic solvent, e.g., acetonitrile or methanol, in water.

There are many problems with the Rao et al method described hereinabove in U.S. Pat. No. 5,380,916. The most important was that plant lipid components and large quantities of chlorophyll were extracted with about 25% by volume ethanol. These lipid and chlorophyll components interfere with the separation in a chromatographic column. The crude product was colored from compounds in the plant material and these colored compounds interfered with the chromatographic separation. The extraction process of this Rao et al, U.S. Pat. No. 5,380,916, produced large quantities of crude extract in which taxol and taxanes were only a minor component. The reverse phase chromatographic separation using the process of this Rao et al U.S. Pat. No. 5,380,916, was such that taxol was not cleanly separated. The mother liquor from the initial separation of the taxol was subjected to additional reverse phase chromatography and recrystallization to separate more taxol. The more polar solvent fractions contain 10-decetylbaccatin III which can be crystallized to remove this compound and then resubjected to standard chromatography. Multiple reverse phrase liquid chromatographic steps may be necessary in the process of this Rao et al U.S. patent.

Rao et al in U.S. Pat. No. 5,380,916, issued Jan. 10, 1998, also described the use of ligroin to remove lipid components. Aqueous methanol removes the crude taxane mixture, which was then extracted with less polar solvents to separate taxol and related compounds from 10 deacetylbaccatin III. The taxanes can be isolated and recrystallized using the reverse phase chromatography. An aqueous methanol extract was partitioned between water and benzene and then extracted with chloroform and the solvents are removed. Methanol or acetonitrile and water was used in reverse phase liquid chromatography to separate the taxanes. However, none of the procedures taught by Rao in U.S. Pat. No. 5,380,916 provided a clean separation of each of the components in a single pass through a column without a solvent-solvent extraction. Large amounts of various solvents are necessary.

U.S. Pat. No. 5,407,674, issued Apr. 18, 1995, to Gabetta, et al., provided a procedure for the isolation of a taxane derivative. The procedure included first extracting the vegetal material of yew cultivar with at least one chlorinated hydrocarbon or mixtures of at least one chlorinated hydrocarbon, e.g., methylene chloride, and at least one lower alkanol, e.g., methanol. In a second step chromatographing the residue obtained in the first step with an eluent comprising a mixture of at least one aliphatic hydrocarbon or aromatic hydrocarbon and at least one solvent having a higher polarity than the hydrocarbon. For example, when the residue is chromatographed on silica gel as a stationary phase and the eluent comprises toluene as the aromatic hydrocarbon. Acetone or diisopropyl ether etherone in admixture, with n-hexane or n-heptane is the solvent having a higher polarity.

U.S. Pat. No. 5,620,875, issued Apr. 15, 1997, to Hoffman et al. taught the separation of paclitaxel and other taxanes by multiple step hexane extractions and high performance liquid chromatography (HPLC). The method is involved, labor intensive and only provides moderate yields of the desired compounds.

U.S. Pat. No. 5,670,673, issued Sep. 23, 1997, to Rao, taught the isolation and purification of taxol and its analogues. The method included the use of reverse phase liquid chromatography on a C18 adsorbent with elution of the adsorbed analogues. Limitations exist with this in terms of productivity and purity of compounds obtained. Reverse phase chromatographic separation of impure taxanes from plant materials is very expensive because of the cost of the column materials. Generally, reverse phase separation can be used on the bark of Pacific Yew because of the relatively low concentration of pigments, lipids and waxes and high concentration of taxol. However, the yew needles contain lesser amounts of taxol and significant amounts of impurities and thus reverse phase chromatography for separation of taxol from the bulk of the yew materials other than Pacific yew bark is not practical. The production of taxol by such prior art technique is encumbered by time consuming extraction and purification procedures; long residence times in a harsh environment; and low overall yields.

U.S. Pat. No. 6,503,396, issued Jan. 7, 2003, to Kim, et al. provided methods for isolating taxol and derivatives thereof with high purity. The method for isolating taxol or derivatives thereof from a source material included the first step of extracting the source material with a supercritical fluid, e.g., carbon dioxide and a cosolvent to obtain an extract, e.g., a mixture of water and methanal or ethanol. It included the second step of liquid-liquid separating the extract with an organic solvent, e.g., (n-hexane, to obtain a solvent layer. It included the final step of isolating taxol or the derivatives thereof from the solvent layer by column chromatography, e.g., using multiple columns to isolate taxol or derivatives, wherein each of said multiple columns comprises a column resin, e.g., silica gel, RP-18, or Sephadex.

Canadian Patent No. 2,126,698, issued Nov. 8, 1993, in the name of Nair, provided a method for the separation of taxanes, particularly taxol, cephalomannine, baccatin III and deacetylbaccatin III, from ornamental yew tissue. The method involved the use of a specific solvent mixture of water and about 50 to 95 percent by volume methanol, ethanol or acetone, and the treatment of the resulting extract using activated carbon, preferably charcoal. The taxanes were preferably separated from the crude extract by a normal phase chromatographic step which preferably was through vacuum and then medium pressure column chromatographic separation, using inexpensive silica gel as an absorbent. The silica gel was regenerated by heating in a furnace above above 500° C. to remove adsorbed organic materials.

Canadian Patent No. 2,157,905, issued Mar. 18, 1994, in the name of Durand et al, provided a method for purifying a method for purifying taxcoids by centrifugal partition chromatography using a mixture of aliphatic hydrocarbons, esters, or alcohols and water having a particular partition coefficient in one phase and having a different partition coefficient in a second phase.

Canadian Patent 2,213,952, issued Jun. 15, 1999, in the name of G. Caron, taught the isolation of paclitaxel and (9-dihydro-1-13-acetylbaccatin III from *Taxus canadensis* by a combination of solvent precipitation and multiple steps of reverse phase HPLC. The methods used in that patent are too complicated and very difficult for industrial scale production. It is also assumed various and large quantities of organic solvent, some of those solvents are toxic and expensive. It is raised environmental concerns about the emission of the organic solvents' gaseous effluent. Also using ODS-2 as a preparative column packing material for industrial production is expensive and increases the production cost. To make a silylated paclitaxel derivative to reach final purity is not feasible in industrial scale and involves extra cost for these purification steps.

STATEMENTS OF INVENTION

Aims of the Invention

In view of the problems of extracting taxanes from plant sources as described above, it is one object of the present invention to provide for the isolation of commercially important natural products from readily available biomass.

Another object of the present invention is to provide an efficient method for obtaining taxanes from mixtures with other compounds or materials.

Another object of the present invention is to provide an isolation procedure for paclitaxel and other taxanes from bark, needles, or cell culture of *Taxus* species which is amendable to industrial scale production.

Another object of the present invention is to provide a process for the isolation and separation of taxol and other taxanes from plant materials, preferably fresh material from ornamental yew, in high yield.

Another object of the present invention is to provide a method which significantly reduces the cost of production of the taxane derivatives.

The present inventor, in U.S. Pat. No. 5,969,165, dated Oct. 19, 1999, provided a high yield and high purity method for obtaining taxane analogues from a source containing taxanes. The method employed a polymeric resin absorbent for separating the analogues under low pressure without the use of complex and extensive separation/purification steps currently provided in the art. That method for isolating and purifying taxane analogues from a source containing taxanes included the first step of extracting a source of taxanes in an organic extractant, e.g., dichloromethane. The second step involved contacting an absorbent medium with the extractant and loading the medium in a column. The column contained an absorbent agent, e.g., aluminium oxide. The next step involved eluting, with an organic solvent mixture, e.g., a mixture of hexane and acetone, at a pressure of between about 10 and 20 psi to generate fractions containing taxane compounds. The next step involved crystallizing the fractions to provide a solid taxane compound and a mother liquor; concentrating said mother liquor. The next step involved eluting, with a polar solvent mixture and mother liquor through a polymeric resin to provide at least a second taxane compound.

Accordingly, an especial object of the present invention is to provide an improvement in the prior art, and in particular, over U.S. Pat. No. 5,969,165, in a way that provides commercial quantities of the above-referenced natural products from readily-available, renewable sources.

GENERALIZED DESCRIPTION OF THE INVENTION

This invention teaches a purification technology to extract an organic solution of paclitaxel by using a "Load and Lock Axial Compression Column" for industrial scale preparative high performance liquid chromatography.

The successful use of a medium and large diameter column in preparative high performance liquid chromatography requires appropriate hardware. The "Load and Lock Axial Compression Column" was designed for this purpose. The column is one in which a piston is used to pack and unpack the chromatography bed and to maintain bed compression during use. This effectively substantially prevents the formation of voids in the bed. The column can be packed with any packing material, including small particle size (about 10 μm) media, and very high plate numbers are generated. The bed length can be adjusted by controlling the amount of packing material used to prepare the column.

Through the use of such "Load and Lock Axial Compression Column" the present invention provides a commercially-economical procedure for the extraction of paclitaxel from *Taxus* sp. The procedure involves a sequence of procedural steps. The last essential step may be carried out on an impure paclitaxel solution which may or may not have been prepared by the third step. Similarly, the third step may be carried out on an impure paclitaxel solution which may or may not have been prepared by the second step. Additionally, the second step may be carried out on an impure paclitaxel solution which may or may not have been prepared by the first step.

In a preferred embodiment, the first step involves the extraction from the plant material, *Taxus* sp, preferably *Taxus canadensis*, (Canadian Yew). Any part of the plant containing one or more taxanes may be employed, e.g., the bark, roots, leaves or needles, branches, twigs, seeds or whole seedlings. Preferably clipping of needles and twigs, should be dried and ground. Grinding of the plant material may be achieved by conventional means, e.g., through use of a chipper and/or a grinding mill. The taxanes can be extracted from the whole plant or from separated parts, e.g., steps, roots, leaves (needles), seeds, or mixtures thereof. The material to be extracted can be either fresh or dried. Preferably, the needles are used.

The plant material is preferably first dried and ground to a suitable particle size usually ranging from about 0.001 to about 10 mm$^3$. The plant material is extracted using an organic solvent, e.g., methanol, ethanol, a mixture of methanol and ethanol, a mixture of dichloromethane and methanol, or a mixture of dichloromethane and ethanol. The filtrate from the extractant is mixed with water and is concentrated in order to reduce the volume of the liquid. The concentrate is partitioned between hexane and water in order to effect the step of defatting. The aqueous liquor is repartitioned between an organic solvent, e.g., dichloromethane, chloroform or ethyl acetate and water, and is concentrated to a thick syrup.

In a preferred embodiment, the second step involves passing the thick syrup through a column. The preferred solution for this ion exchange is the thick syrup prepared in the first step, which is diluted with an organic solvent, e.g., acetone, ethanol or isopropanol. However, any suitable organic solution containing extracted paclitaxel may be the starting material in this second step.

The syrup in, e.g., dichloromethane/acetone/water, is separated into several fractions by pouring through a medium pressure column containing a polymeric absorbent resin. The polymeric absorbent resin may be, e.g., a polystyrene DVB resin, a polymethacrylate resin or any other suitable polyaromatic resin. The most common type of resin used in polymeric absorbent resin are polystyrene polymers with crosslinking divinylbenzenes. The polymeric absorbent resin should have a suitable particle size, which is thus suitable for the column size and the designated working pressure and flow rate. One non-limiting example is a particle size of about 5to 100 mesh.

The eluent solution is passed through the column with step gradients of a suitable water-miscible solvent, e.g., acetone/water, methanol/water, ethanol/water or acetonitrile/water. The flow rate is variable and can be changed according to the various operating conditions. One non-limiting example is a flow rate of about 2 L/min.

The fractions containing up to about 45% acetone/water are allowed to form crystals of (9-dihydro-1,3-acetylbaccatin III.

The fractions containing more than about 45% acetone/water are concentrated to remove most of the acetone and are extracted with a suitable organic solvent, e.g., ethyl acetate, $CH_3CL$ or $CH_2Cl_2$ and is concentrated to provide a crude solid residue of paclitaxel.

The third step involves the purification of crude solid paclitaxel. Preferably, this crude solid paclitaxel is the product of the second step. However, crude solid paclitaxel however produced may be the starting material for this third step.

The crude solid paclitaxel is dissolved in a suitable water-miscible solvent, e.g., acetone, in order to effect the step of defatting, and the water-miscible organic solvent/water solution, e.g., an acetone/water solution thereof, is eluted by way of axis compression column chromatography. This system is a high performance liquid chromatography system, with means to provide and maintain a high pressure, e.g., about 250 to 400 psi or even as high as about 5000 psi.

This column containing a suitable ion exchange resin as described above is loaded with the paclitaxel solution and is eluted with gradients of, e.g., acetone/water, at the above high pressure. The fractions containing paclitaxel in such acetone/water were allowed to crystallize, and dried to provide semi-pure paclitaxel.

The final step involves the purification of the semi-pure paclitaxel. Preferably, the semi-pure paclitaxel is the product of the third step. However, semi-pure paclitaxel, however produced, may be the starting material for the final step.

The column used in the final step is the same column as used in the third step. The ion exchange resin, or packing medium in the column may be diphenyl bonded silica gel or (C-18 bonded silica gel or any other reverse phase packing material.

The semi-pure paclitaxel is dissolved in a suitable water-miscible solvent, e.g., acetonitrile, ethanol or methanol. This solution is loaded into the packed column and is eluted with gradient solvents of the water-miscible organic solvent/water solution, e.g., acetonitrile/water, at a suitable rate, e.g., about 350 ml/min and a suitable pressure maintained at, e.g., about 600 to 800 psi or even as high as about 1000 psi.

The fraction containing pure paclitaxel was allowed to crystallize, and the crystals were then recrystallized from acetone/hexane. A pure white powder paclitaxel is provided.

Statements of Invention

The present invention in a first aspect provides a method for isolating and purifying taxane analogues from a source containing the taxane analogues comprising the essential step of passing a solution containing the taxane derivatives through a chromatographic column in which the packing media in the column has been compressed substantially to avoid voids therein, and maintained at high pressure of e.g., about 250 to 400 psi or even as high as about 5000 psi.

The present invention in a second aspect comprises the preliminary step of passing an organic solution containing impure taxanes through a chromatographic column in which the packing media in the column has been compressed substantially to avoid voids therein, and is maintained at a high pressure of, e.g,. about 300 to 400 psi, or even as high as 1000 psi.

The present invention in a third aspect comprises passing a syrup of extracted paclitaxel in an organic solvent through a chromatographic column in which a packing medium has been compressed substantially to avoid voids therein and is maintained at a pressure of up to about 1000 psi, e.g., about 30–50 psi.

The present invention in a fourth aspect comprises extracting a biomass of *Taxus* with an organic solvent and partitioning the solution between hexane and water, then re-partitioning the solution between dichloromethane or chloroform and water, and recovering a dichloromethane or chloroform solution of impure paclitaxel.

FEATURES OF THE INVENTION

Sub-features of the First Aspect

In a feature thereof, the organic solution comprises methanol, ethanol, a mixture of methanol and ethanol, a mixture of dichloromethane and methanol or a mixture of dichloromethane and ethanol.

In sub-features thereof, the packing media comprises diphenyl bonded silica gel or (C-18 bonded silica gel.

In a sub-feature thereof, the column is eluted with a gradient solution of acetone/water, methanol/water or acetonitrile/water.

In a sub-feature thereof, the flow rate is about 350 ml/minute, and the pressure is maintained at about 600 to 800 psi.

In a sub-feature thereof, the method includes the step of crystallizing and recovering substantially-pure paclitaxel.

In a sub-feature thereof, the solution of taxane analogues comprises a solution of crude crystalline paclitaxel in ethanol.

Sub-features of the Second Aspect

In a sub-feature thereof, the organic solution comprises acetone/water, ethanol/water or isopropanol/water.

In a sub-feature thereof, the packing medium in the column comprises a polystyrene-DVB resin, or a polymethacrylate resin or a polyaromatic resin.

In a sub-feature thereof, the column is eluted with gradient solvent of acetone/water, methanol/water or acetonitrile/water.

In a sub-feature thereof, the flow rate is about 1 L/minute.

In a sub-feature thereof, the method includes the step of crystallizing impure paclitaxel from the eluate of the column.

Sub-features of the Third Aspect

In a sub-feature thereof, the packing medium is polystyrene-DVB resin, or a polymethacrylate resin or a polyaromatic resin.

In a sub-feature thereof, the column is eluted with step gradients of acetone/water, methanol/water or acetonitrile/water.

In a sub-feature thereof, the flow rate of eluent through the column is about 350 ml/min and at a pressure of about 600 to 800 psi, or even as high as 1000 psi.

In a sub-feature thereof, the method includes the step of crystallizing (9-dihydro-1,3-acetylbaccatin III from a portion of the eluent from the column.

In a sub-feature thereof, the method includes the step of crystallizing crude paclitaxel from a portion of the eluent from the column.

Sub-feature of the Fourth Aspect

In a sub-feature thereof, the biomass is refluxed in methanol to provide a methanol solution of paclitaxel.

EXAMPLE 1

Extraction of Biomass: The plant material (Canadian yew, *Taxus canadensis*) was harvested in the Canadian provinces of P.E.I. and New Brunswick in the fall 2002, and contained about 0.032% of paclitaxel. The fresh clippings of the Canadian yew were dried in a drying kiln at about 60 to 70° C. before grinding.

600 kilograms of the ground needles and twigs of biomass was placed into a 3000 extractor which equipped with a reflecting condenser. 2400 L of methanol were then added. The biomass was refluxed with methanol for about 3 hours, the solvent was filtered, and the first filtrate was collected. 2000 L of methanol was then added to the biomass reside after filtration, was reflexed for about 2 hours, and was then filtered. The second filtrate was collected and the biomass was discharged. The first and second filtrates were combined and about 10% water was added. The aqueous solution was concentrated in an evaporator under vacuum to about 15% of its original volume.

The concentrate was twice partitioned between hexane and water to defat the concentrate. The aqueous layer was collected and was twice re-partitioned between dichloromethane (or chloroform) and water. The organic layer was collected and concentrated in an evaporator under vacuum to a thick syrup. The hexane layer was recovered, and the water layer was discharged.

Approximately 45 kilograms of syrup was obtained from 600 kilograms of biomass. The dichloromethane syrup contained approximately 1 to 1.3% of paclitaxel.

EXAMPLE 2

Primary Purification of Paclitaxel: 23 Kilograms of the dichloromethane syrup from Example 1 were diluted with 10 L of acetone in a container equipped with a mechanical stirrer, with warming if necessary. The stirring was adjusted to 1.5 rotations per second and 3 L of deioned water was added gradually over a period of 10 minutes. The aqueous solution of the dichloromethane syrup was separated into several fractions by a stainless steel, industrial scale, medium pressure column which was equipped with a medium pressure metering diaphragm pump.

A slurry of 120 kilograms of polystyrene-DVB resin (Rohm-Hass XAD-1600), with a particle size of about 50 to 100 mesh, in methanol, was poured into the column which was 300 mm diam. and 3000 mm long. After the column had settled while the solvent was pumped at about 30 to 50 psi, the methanol was replaced with about 30% acetone in water until the column was equilibrated.

The diluted syrup sample was transferred to the top of the column. The container was rinsed with a few L of 30% acetone in water and the slurry was transferred to the column. The column was then sealed and started to flow as the elution solvent was pumped into the column. The column was then eluted with step gradients of 35, 45, 50, 60, 65, 70 and 80% acetone/water. The flow speed was controlled at about 2 L per minute. Fractions of approx. 20 liter each were collected with the pressure maintained between about 30 to 50 psi.

After first washing with 80% acetone/water, the column was washed with pure acetone, followed by washing with a mixture of acetone/ethyl acetate (1:1) until the effluent, which was initially very dark, become colorless.

After washing, the column was equilibrated again with 30% acetone in water, at which point it was regenerated and was ready for next run.

The fractions which were collected were monitored by UV absorbance at 227/nm with analytical HPLC, and with TLC monitored by spraying, 10% $H_2O$ in ethanol. The fractions (most in 45% acetone/water) containing (9-dihydro-13-acetylbaccatin III were combined and concentrated to remove most of acetone and left in a hood overnight until crystallization completed. The crystals were filtered out and re-crystallized from methanol to yield 240 grams of pure (9-dihydro-13-acetylbaccatin III as white, needle like crystals. Yield: 0.08%.

The fractions (most in 65% acetone/water) containing paclitaxel were combined and concentrated to remove most of acetone. The aqueous solution was extracted with ethyl acetate. The organic phase was collected and concentrated to dryness. The residue was analyzed by analytical HPLC. The residue (crude paclitaxel material) contained about 10 to 15% paclitaxel. The recovery of paclitaxel was between about 90 to 100% from the dichloromethane syrup.

EXAMPLE 3

Secondary Purification of Paclitaxel: The secondary purification used a preparative high performance liquid chromatography system, which is called "axis compression column chromatography". The column used was a Varian Load and Lock axis compression column (250 mm diam.×1000 mm long). The chromatographic system was a Varian ST-4000 system, which was equipped with two high pressure diaphragm pumps, a sample inlet port, a UV detector, and a Varian control software system. The column was equipped with a hydraulic piston for packing and unpacking the column and lock adaptor. After full packing the column with 50 liter of polystyrene-DVB resin (Rohm-Hass CG-161 m, particle size about 75 μm) in ethanol, the hydraulic piston was turned on. The piston slowly move out to compress the column packing media at a pressure of about 3000 psi. While the column was compressed, the lock was switched to its locking position to lock the column. Thus, the column can generate a very high plate number. After the column had settled while the solvent was pumped at about 250 to 300 psi, the ethanol was replaced with about 30% acetone in water until the column was equilibrated.

The residue from Example 2, approx. 1.5 kilograms, was dissolved in 4 L of acetone until all solid was dissolved. 2 L of water was gradually added with stirring, and was filtered if necessary. The aqueous solution was then pumped into the column though the sample inlet port.

The column was then eluted with gradient solvents of acetone/water (starting from 50% acetone in water, ending at 100% acetone). The flow rate was controlled at 1 L per minute. Fractions of approx. 5 liter each were collected with the pressure maintained at between about 300 to 400 psi.

The fractions collected were monitored by U.V. absorbance at 227/mm with analytical HPCL and with TLC monitored by spraying 10% $H_2O$ in ethanol. The fractions (most in 70% acetone/water) containing paclitaxel were combined and concentrated to remove most of acetone and were left in a hood overnight until crystallization completed. The crystals were filtered out and re-crystalized from 70% methanol in water and dried in a vacuum oven to yield 235 grams of slightly white, needle-like crystals. This semi-pure paclitaxel had a purity of about 70 to 80%. Yield: about 90 to 95% from the crude paclitaxel material.

EXAMPLE 4

Final Purification of Paclitaxel: The final purification used a preparative high performance liquid chromatography system, and an axis compression chromatographic column. The column used was a Varian Load and Lock axis compression high pressure column (100 mm diam.×1000 mm long). The chromatographic system was a Varian SD-2 preparative HPLC system, which was equipped with a sample inlet port, a UV detector, and a Varian control software. The column was equipped with a hydraulic piston for packing and unpacking the column and with a lock adaptor. The packing media used was diphenyl bonded silica gel or (C-18 bonded silica gel.

After full packing the column with 6 liter of packing media in ethanol, the hydraulic piston was turned on. The piston slowly moved out to compress the column packing media at a pressure of about 3000 psi. While the column was compressed, the Lock was switched to its locking position to lock the column. Before using the column for purification, the ethanol was replaced with about 30% acetonitrile in water until the column was equilibrated.

The crude paclitaxel from Example 3, approx. 50 grams, was dissolved in 200 ml of acetonitrile until all solid was dissolved. 100 ml of water was gradually added with stirring and was filtered if necessary. The aqueous solution was then pumped into the column through the sample inlet port.

The column was then eluted with gradient solvents of acetonitrile/water (starting from 30% acetonitrile in water, ending at 100% acetonitrile). The flow rate was controlled at about 350 ml per minute. Fractions of approx. 1 L each were collected with the pressure maintained between about 600 to 800 psi.

The fractions collected were monitored by U.V. detector with an absorbance at 227/nm, and was monitored with TLC by spraying about 10% $H_2O$ in ethanol. The fractions containing pure paclitaxel were combined and concentrated to remove most of acetonitrile and left in a hood overnight until crystallization was completed. The crystals were filtered out and re-crystallized from acetone: hexane (1:1) and dried in a vacuum oven to yield 36.5 grams of white powder. This pure paclitaxel has a purity of greater than about 99%. Yield: about 85 to 90% from the about 70 to 80% pure crude paclitaxel.

The total overall yield is greater than about 73%.

CONCLUSION

The process of the present invention is simple. It provides paclitaxel and other taxanes in high yield and purity on industrial scale. The present invention therefore, provides cost-effective processes for mass production of paclitaxel and other related taxanes from a vegetal source or tissue culture particularly, *T. canadensis*.

The present invention provides methods for mass production of paclitaxel and related taxanes from plants of the genus *Taxus* (Taxaceae).

The isolation and purification process of aspects of this invention permits a highly efficient recovery of taxane derivatives in pure form from a naturally-occurring *Taxus* species. The improvement with this invention over the prior art is reflected in the high overall recovery yield of the taxanes as well as in the purity of the taxanes isolated.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. A method for isolating and purifying taxane analogues from a source containing said taxane analogues comprising passing an organic solution containing said taxane derivatives through a first chromatographic column, wherein said column comprises a polystyrene DVB packing media which has been compressed substantially to avoid voids therein at a pressure of up to about 5000 psi, thereby to provide an organic solution containing impure taxane analogues including paclitaxel and 9-dihydro-13-acetylbaccatin III.

2. The method according to claim 1, wherein said organic solution is in a solvent which is selected from the group consisting of methanol, methanol/water, ethanol, ethanol/water, a mixture of methanol and ethanol, dichloromethane, chloroform, a mixture of dichloromethane and methanol, a mixture of dichloromethane and ethanol, acetone/water and acetonitrile/water.

3. The method according to claim 2, wherein said organic solvent is methanol/water.

4. The method according to claim 1, including the step of eluting said chromatographic column with a gradient solution of an eluant which is selected from the group consisting of acetone/water, methanol/water and aceton itrile/water.

5. The method as claimed in claim 4 wherein said eluant is acetone/water.

6. The method according to claim 1, wherein the flow rate is about 350 ml/minute, and wherein the pressure is maintained at about 600–800 psi.

7. The method according to claim 1, including the step of crystallizing and recovering substantially-pure paclitaxel.

8. A method according to claim 1 for isolating and purifying taxane analogues from a source containing said taxane analogues further comprising:

the second step of passing said organic solution containing said impure taxane analogues through a second chromatographic column in which a packing media in said column has been compressed to obviate voids in said column and is then maintained at a pressure of up to about 400 psi.

9. The method according to claim 1, wherein said organic solution containing said taxane derivatives is passed through said first chromatographic column under a pressure of at least 30 psi.

10. The method according to claim 1, wherein said organic solution containing said taxane derivatives is passed through said first chromatographic column under a pressure of about 30 psi to about 400 psi.

11. The method according to claim 1, wherein said organic solution containing said taxane derivatives is passed through said first chromatographic column under a pressure of about 30 psi to about 50 psi.

12. The method according to claim 1, wherein said resin has a particle size of about 50 mesh to about 100 mesh.

13. The method according to claim 1, wherein at least one isolated fraction of substantially pure 9-dihydro-13-acetylbaccatin III is further obtained.

14. The method according to claim 1, further comprising recovering at least one fraction comprising 9-dihydro-13-acetylbaccatin III and recrystalizing the so-obtained 9-dihydro-13-acetylbaccatin III.

15. The method according to claim 1, wherein the flow rate is about 350 ml/minute to about 2 L/minute.

16. The method according to claim 1, further comprising passing said obtained organic solution containing said impure taxane analogues through a second chromatographic column in which a packing media in said column has been compressed to obviate voids, wherein said packing media comprises a resin chosen from polystyrene-DVB resin, a polymethacrylate resin and a polyaromatic resin, thereby obtaining a syrup containing semi-pure paclitaxel.

17. The method according to claim 16, wherein said semi-pure paclitaxel has a purity of about 70% to about 80%.

18. The method according to claim 16, further comprising passing said obtained syrup through a third chromatographic column in which a packing media in said column has been compressed to obviate voids, wherein said packing media comprises a resin chosen from polystyrene-DVB resin, a polymethacrylate resin and a polyaromatic resin, thereby obtaining substantially pure paclitaxel.

19. The method according to claim 8, wherein in said second step, the solute of said organic solution comprises a solvent which is selected from the group consisting of methanol/water, acetone/water, ethanol/water and isopropanol/water.

20. The method according to claim 8, wherein said packing medium in said second chromatographic column comprises a resin which is selected from the group consisting of a polystyrene-DVB resin, a polymethacrylate resin and a polyaromatic resin.

21. The method according to claim 8, wherein said second chromatographic column is eluted with a gradient solvent which is selected from the group consisting of acetone/water, methanol/water and acetonitrile/water.

22. The method according to claim 21, wherein the flow rate is about 1 L/minute.

23. The method according to claim 8, including the step of crystallizing impure paclitaxel from the eluate of said column.

24. The method according to claim 8 for isolating and purifying taxane analogues from a source containing said taxane analogues comprising:

the third step of passing said extracted paclitaxel in said organic solvent through a third chromatographic column in which a packing medium is compressed to obviate voids in said column, and is maintained at a pressure of up to about 50 psi.

25. The method according to claim 24, wherein said packing medium in said third chromatographic column is a resin which is selected from the group consisting of a polystyrene-DVB resin, a polymethacrylate resin and a polyaromatic resin.

26. The method according to claim 24, wherein the organic solvent in said essential step comprises dichloromethane.

27. The method according to claim 26, wherein, in said third chromatographic column is eluted with step gradients of an eluant which is selected from the group consisting of methanol/water, acetone/water, ethanol/water and isopropanol/water.

28. The method according to claim 27, wherein the flow rate of eluent through said third chromatographic column is about 2 l/minute.

29. The method according to claim 24, including the step of crystallizing (9-dihydro-1,3-acetylbaccatin III from a portion of eluent from said third chromatographic column.

30. The method according to claim 24, including the step of crystallizing crude paclitaxel from a portion of eluent from said third chromatographic column.

31. The method according to claim 24, including the preliminary steps of extracting a biomass of *Taxus* with an organic solvent;
partitioning said solution between hexane and water;
then repartitioning the solution between dichloromethane or chloroform and water; and
finally recovering a dichloromethane or chloroform solution of crude paclitaxel.

* * * * *